O. B. THOMPSON.
Adjustable-Axle Nut.

No. 204,399.      Patented May 28, 1878.

Witnesses:
John K. Smith
John F. Best

Inventor:
Orrin B. Thompson
by
Bakewell & Kerr
Attys

UNITED STATES PATENT OFFICE.

ORRIN B. THOMPSON, OF JERSEY, OHIO.

IMPROVEMENT IN ADJUSTABLE AXLE-NUTS.

Specification forming part of Letters Patent No. 204,399, dated May 28, 1878; application filed January 29, 1878.

*To all whom it may concern:*

Be it known that I, ORRIN B. THOMPSON, of Jersey, in the county of Licking and State of Ohio, have invented a new and useful Improvement in Adjustable Axles; and I do hereby declare the following to be a full, clear, and exact description thereof, reference being had to the accompanying drawings, forming part of this specification, in which—

Figure 1:
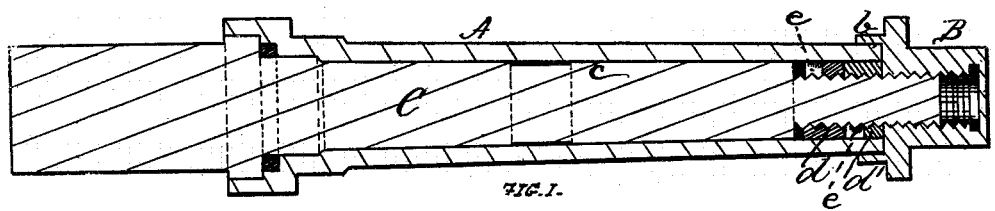
Figure 2:
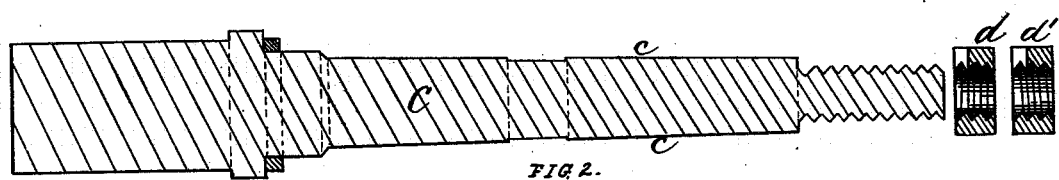
Figure 3:
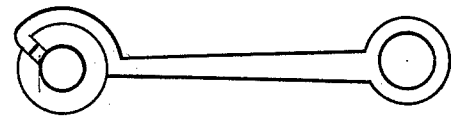
Figure 3:
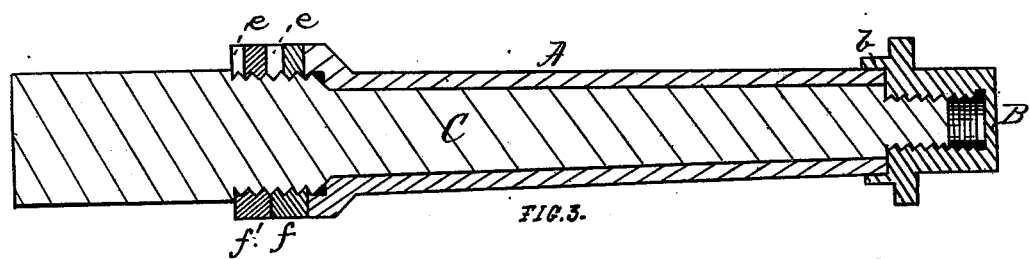

Figure 1 is a longitudinal central section of a spindle, box, and nut, illustrating the preferred form of devices embodying my invention. Fig. 2 is a detached view, in elevation, of the spindle and adjustable rings. Fig. 3 is a modification.

Like letters refer to like parts wherever they occur.

My invention relates to the construction of anti-rattling axles for vehicles, &c.; and consists, first, in combining with the spindle an adjustable sleeve, whereby the length of the spindle or bearing within the box can be increased or decreased and adjusted at will, to permit the adjustment of the nut to take up the wear of the washers and prevent rattling and wear, or to dispense with washers entirely, at pleasure; secondly, in combining with the spindle and adjustable sleeve a second adjustable sleeve or jam-nut, to insure the adjustment of the main sleeve during the removal and replacing of the box; and, finally, in details of construction hereinafter more specifically set forth.

In the construction of axles for vehicles, especially the better class of vehicles, the wheels are held on by internally-threaded caps or nuts, and in order that these may not come off, the screw-threads on the ends of the spindles are in reverse to the line of motion. The axle-box is usually somewhat shorter than the bearing-surface of the spindle, and the space between the nut and spindle is filled by a washer of suitable thickness to take up the space and prevent rattling and wear of the parts. In course of time the wear of the washers, &c., permits the play of the parts, and a rattling disagreeable noise is made unless the nut is tightened or new washers inserted. The difficulty of always obtaining suitable washers, and the attendant trouble and expense, have led to the invention of various devices for taking up the slack or wear, so as to counteract the difficulty specified. If the depth of the nut or cap alone be depended upon, or its projection over the bearing portion of the spindle, the nut is liable to be tightened up by revolving with the wheel by reason of frictional contact until it sets so tight as to jam or lock the wheel. Heretofore, so far as I am aware, almost all, if not all, inventions in this line have been directed to limiting and adjusting the advance of the nut, by set-screws and like means, in either the nut or end of the spindle. My invention looks to the use of the ordinary nut, and depends on adjustment of the spindle within its bearing-surface.

I will now proceed to describe my invention, so that others skilled in the art to which it appertains may apply the same.

In the drawings, A represents the ordinary axle-box; B, the usual or any approved cap or nut, cupped, as at $b$, to inclose the end of the axle-box; and C, my improved spindle. The length of the spindle is not changed; but the continuous bearing-surface $c$ of the spindle is reduced, or made considerably less than the length of the box, and the threaded end of the spindle is increased or made longer than usual. Upon the threaded end of the spindle is placed one or more internally-threaded sleeves or collars, $d\ d'$, whose exterior diameter agrees with that of the spindle, so as to complete the bearing-surface thereof, and whose width or combined width should, when added to the length of the continuous bearing $c$, make the bearing-surface of the spindle the same as or preferably somewhat less than, the length of the box. A single ring, $d$, may be employed, and when in use will be jammed by the nut B; but as its position is liable to change in removing or replacing the wheel, I prefer to make the sleeve in two sections, or to use really two screw-sleeves, $d\ d'$, so that one shall jam the other. In order that the screw-sleeves may be readily adjusted, notches $e$ are generally formed therein for the hold of a suitable wrench.

With such devices washers may be used or not, as preferred, the adjustment being regulated accordingly.

If washers are used, the sleeve $d$ or sleeves $d\ d'$ are turned and adjusted on the threaded portion of the spindle until they project sufficiently beyond the box (when the latter is in position) to receive a washer of the desired thickness, after which the nut B is screwed up in the usual manner.

If a washer or washers are not used, then the sleeves $d\ d'$ are turned back or adjusted so that their outer ends are about flush with the axle-box, or as nearly as is desired, and the nut B is then screwed on. When any wear, either of washer or end of axle-box, occurs, and attendant rattling is heard, the wheel can be removed and the sleeve $d$ or sleeves $d\ d'$ turned slightly back on the threaded end of the spindle, and when the wheel is replaced the nut will advance enough farther on the end of the spindle to take up the wear.

In Fig. 3 the same principle is shown in a somewhat modified construction—that is to say, the adjustable sleeves $f\ f'$ (the equivalents of $d\ d'$) are placed on the inner end or shoulder of the spindle, which is threaded to admit of their adjustment. In such position a second threaded collar, or its equivalent, is necessarily used in order to jam or fix the main adjustable sleeve or collar, while if the invention is applied to the extremity of the spindle, the nut B can be made in a great degree to perform the function of the second collar.

Whenever the rings $d\ d'$ are turned to effect an adjustment and take up the wear of the parts, the bearing-surface thereof is changed, which is a material advantage in many respects.

The advantages of my invention are durability, simplicity, and effectiveness.

Having thus described my invention, what I claim, and desire to secure by Letters Patent, is—

1. The combination, with the threaded spindle, of one or more sleeves or collars independently adjustable thereon, and adapted to lengthen or shorten the bearing-surface of the spindle, substantially as and for the purpose specified.

2. The combination, with the threaded spindle, of one or more independently-adjustable sleeves or collars arranged and adapted to form an adjustable shoulder or collar for a bearing for either the box or nut, substantially as specified.

In testimony whereof I, the said ORRIN B. THOMPSON, have hereunto set my hand.

ORRIN B. THOMPSON.

Witnesses:
F. W. RITTER, Jr.,
JAMES I. KAY.